Figure 1:
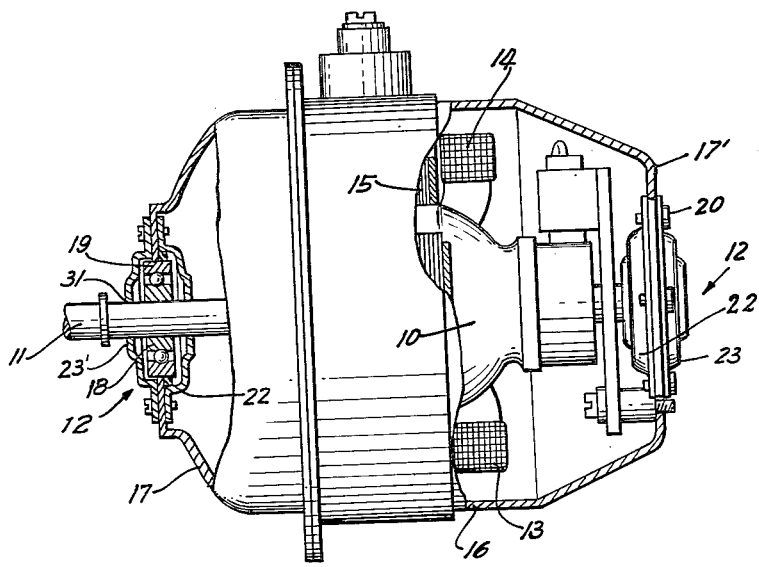

June 25, 1963 N. K. LINDGREN 3,095,248

BEARING MOUNT FOR ROTATABLE MACHINES

Filed Jan. 9, 1961

INVENTOR.
Nils Kauri Lindgren
BY Edmund A. Nerander
his ATTORNEY 3,095,248
BEARING MOUNT FOR ROTATABLE MACHINES
Nils Kauri Lindgren, Stockholm, Sweden, assignor to Aktiebolaget Electrolux, Stockholm, Sweden, a corporation of Sweden
Filed Jan. 9, 1961, Ser. No. 81,430
Claims priority, application Sweden Jan. 9, 1960
4 Claims. (Cl. 308—178)

My invention relates to bearing mounts for rotatable machines.

An object of my invention is to provide an improved bearing mount which can be readily assembled.

Another object of my invention is to provide an improved bearing mount having the parts thereof and the support upon which it is mounted formed of sheet-like material, and to provide a construction which is simple and inexpensive to manufacture.

My invention will be more fully set forth in the following description referring to the accompanying drawing, and the features of novelty which characterize the invention will be pointed out with particularity in the claims annexed to and forming a part of this specification.

Figure 2:
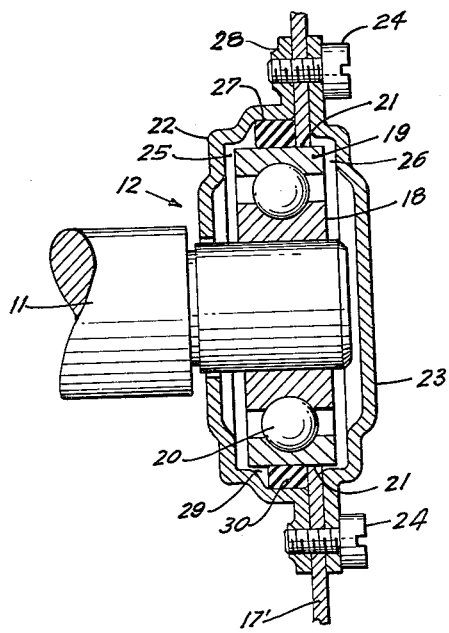

In the drawing,

FIG. 1 is a side elevation, partly in section, of a dynamo-electric machine embodying my invention; and FIG. 2 is an enlarged fragmentary sectional view of part of the construction shown in FIG. 1.

Referring to FIG. 1, I have shown my invention embodied in a dynamo-electric machine having a rotatable member which includes a laminated core 10 fixed to a shaft 11 having the opposite ends thereof journaled in bearings 12. The stationary member of the machine includes a winding 14 provided on a laminated magnetic field structure 15 of annular form which is positioned within a housing 16 having end walls 17 and 17' in which the bearings 12 are secured. The bearings 12 include inner and outer races 18 and 19, respectively, formed to receive balls 20 therebetween in a conventional manner.

In accordance with my invention, the bearings 12, at regions between their opposing sides or faces, are held at the end walls 17 and 17' of the casing 16 in openings 21 in which intermediate regions of the outer races 19 of the bearings 12 snugly fit. I do this by providing at the right-hand end wall 17' of FIG. 1 a pair of cooperating plates 22 and 23 which, at their peripheral edge portions, are removably secured by bolts 24 to opposing sides of the end wall 17' and form an enclosing shell for the bearing 12. As seen in FIG. 2, the plates 22 and 23 are respectively formed with recesses 25 and 26 which are of annular form and L-shaped in section and between which the bearing 12 is firmly anchored at the vicinity of the outer race 19 to the right-hand end wall 17' by the bolts 24.

The shoulder 27 of the plate 22 parallel to the axis of the shaft 11, at the region thereof between the recess 25 and radially disposed flange 28, is radially spaced from the outer peripheral surface of the outer race 19 and with the wall 17' forms a three-sided cavity 29 of circular form which receives a ring-shaped resilient member 30. The ring-shaped resilient member 30, which may be formed of an elastic material like rubber, for example, prevents axial movement of the bearing 12 and also prevents angular movement of the outer race 19 with respect to the end wall 17'. Accordingly, the resilient member 30 is compressed between the axially extending portion or shoulder 27 of plate 22 and the outer race 19 to anchor the latter in the cavity 29 and prevent angular movement of the outer race about the axis of the shaft 11. Further, the resilient member 30 is compressed between the L-shaped recess 25 of the plate 22 and the end wall 17' of housing 15 and firmly anchors the bearing 12 at the edge of the end wall 17' defining the opening 21 therein.

The bearings 12 are secured in the end walls 17 and 17' in the same manner, the only difference between the two bearing mounts being that plate 23 at the right-hand end wall 17' is imperforate while the corresponding plate 23' at the left-hand end wall 17 is formed with an opening 31 through which the motor shaft 11 extends.

It will thus be seen that I have provided for rotatable machines having housings formed of sheet metal and the like an improved bearing mount having bearing shells which may be formed of sheet metal, whereby a simple construction is obtained which is inexpensive and easily manufacture.

Although I have illustrated and described a particular embodiment of my invention, I desire not to be limited to the particular arrangement set forth. For example, the bearing shell may be formed of plastic in sheet-like form. Also, the bearing shell may be employed for retaining in position other forms of bearings such as hemispherical slide bearings, for example. Therefore, I intend in the following claims to cover all modifications which do not depart from the spirit and scope of the invention.

I claim:

1. In combination, a rotatable shaft, an annular bearing having inner and outer race members and anti-friction bearing elements therebetween, the inner race member being fixed to the shaft, the inner and outer race members having spaced sides which are transverse to the axis of the shaft, a wall having an opening, the outer race member extending through the opening with its outer peripheral surface, at an intermediate region between the transverse sides thereof, substantially at the edge of the wall member defining the opening therein, a pair of plates having radially disposed inner parts and outer flanges, at least one of the plates having a shoulder extending axially of the shaft between its inner part and outer flange, means for fixing the flanges of the plates to opposing sides of the wall, the inner parts of the plates being axially removed from the transverse sides of the inner and outer race members, the inner part of the one plate projecting radially beyond the outer peripheral surface of the outer race member, and the shoulder of the one plate being radially removed from the outer peripheral surface of the outer race member and encircling a region thereof at one side of the wall, the one side of the wall and the outer peripheral surface of the outer race member and the inner surface of the shoulder defining a three-sided annular cavity encircling the outer race member, means for anchoring the intermediate region of the outer peripheral surface of the outer race member to the wall at the edge defining the opening therein, the anchoring means comprising resilient material which is under compression and distributed about the cavity and extends axially from the one side of the wall toward one side of the outer race member, and the compressed resilient material bearing against the outer peripheral surface of the outer race member and the inner surface of the shoulder and the one side of the wall at the edge defining the opening therein.

2. The combination set forth in claim 1 in which the resilient material is held under compression in the cavity by the one plate having the shoulder.

3. The combination set forth in claim 1 in which the resilient material is in the form of an annulus.

4. The combination set forth in claim 1 in which the resilient material is in the form of an annulus and held under compression in the cavity by the plate having the one shoulder, the annulus of resilient material being disposed between the one side of the wall and the one side of the outer race member.

References Cited in the file of this patent

UNITED STATES PATENTS

| | | |
|---|---|---|
| 2,653,063 | Arndt et al. | Sept. 22, 1953 |
| 2,837,382 | Schaefer | June 3, 1958 |
| 2,858,174 | Mitchell | Oct. 28, 1958 |

FOREIGN PATENTS

| | | |
|---|---|---|
| 664,939 | Great Britain | Jan. 16, 1952 |